United States Patent Office 3,798,174
Patented Mar. 19, 1974

3,798,174
METHOD OF PREPARING THICKENING GRADE SILICA COMPOSITION
Ellsworth George Acker and Rimantas Glemza, Baltimore, Md., assignors to W. R. Grace & Co., New York, N.Y.
No Drawing. Filed Apr. 21, 1972, Ser. No. 246,182
Int. Cl. B01j 13/00; C01b 33/12, 33/14
U.S. Cl. 252—317                                17 Claims

ABSTRACT OF THE DISCLOSURE

Thickening grades of silica are produced by an insolubilization technique. The process comprises forming an ammoniated alkali silicate solution, acidulating this solution to a pH of about 10.4 to 11 to form a silica hydrosol, and then prior to the setting of this hydrosol to a hydrogel, rapidly admixing this hydrosol with an ammonium salt solution. This admixing tends to further insolubilize the silica which then forms as soft loosely aggregated particles. This silica can then be concurrently deaggregated, and dried, dried and deaggregated or dewatered and deaggregated. This final processing will depend on the charactistics of the silica to be produced.

---

This invention relates to a method for producing finely divided silica materials which are very useful as thickening agents for resins and reinforcing agents for rubber.

Silicas are known materials for thickening mineral oil and polyester and other resins. Silica products have also been used as reinforcing agents for natural, synthetic and silicone type rubbers. The silica materials that have been used in this manner are essentially 100 percent silica products. These silica products are also characterized by having a porous structure. The particle size of these silica materials, which have been found very useful, is in the range of from about 0.01 to 2 microns.

The silica materials which have been generally used as thickening agents and reinforcing agents are of the type termed "silica gels" or "pyrogenic silica." These silica materials have differeing structural characteristics, however they do also have common characteristics. Important common characteristics are a porosity and a small particle size. The pyrogenic silica materials are prepared by the decomposition or oxidation of vaporized silicon containing compositions such as ethyl silicate or silicon tetrachloride. The silica gel materials have characteristically been prepared by the acidulation of a silicate solution, usually sodium silicate, and allowing this silicate solution to set to a gel which totally includes the water media.

It has now been found that a very useful silica thickening agent and reinforcing agent can be prepared by a silica insolubilization type of process. This insolubilization process consists of first forming a silicate solution which contains a portion of ammonium ion, acidulating this mixture with carbon dioxide or a dilute acid to form a hydrosol made up of silica micelles which are of a size of about 10 to 40 millimicrons, pouring this silica hydrosol into an ammonium salt solution which contains ammonium hydroxide, and allowing a silica gel to precipitate. The addition of the silica hydrosol to the ammonium sulfate solution is conducted rapidly under agitation. The resulting silica is formed as a slurry of loosely aggregated silica micelles.

The important characteristics of this process are the following:

(1) The concentration of silica present in the initial silicate solution;

(2) The ratio of ammonia to silica in the silicate solution;

(3) The time the silica hydrosol is permitted to stand prior to addition to the ammonium salt solution;

(4) The set time of the silica in the ammonium salt solution, and (5) The comopsition of the ammonium salt solution, i.e., pH.

In more detail, this process consists of forming colloidal silica micelle particles in a silica hydrosol and then insolubilizing all silica particles in a loose, flocculant structure in the buffered ammonium salt solution. Potentially very finely divided silica is thereby produced in the resulting aqueous slurry. These silica particles are then removed from the aqueous slurry, washed and deaggregated to a fine particle size. The silicate solution which is used is an alkali silicate solution, with the alkali silicate being sodium silicate. Sodium silicate is preferred due to the ease of handling and its low cost. The concentration of silica ($SiO_2$) in the alkali silicate is in the range of from 4 to 12 percent. The preferred concentration of silica in the silicate solution is about 6 percent. After forming the alkali silicate solution, ammonia in the form of ammonium hydroxide or diluted ammonia gas is added to this alkali silicate solution. The ammonia is added so as to produce a silica to ammonia ratio of from about 6 to 1 to about 30 to 1. The preferred ratio of silica to ammonia is 18 to 1. The function of this ammonia is to reduce the solubility of silica in highly alkaline media. After formation of the sodium silicate solution containing the ammonia, carbon dioxide or dilute acid is added to form a silica hydrosol. A silica hydrosol contains silica micellular particles of a particle size of about 10 to 40 millimicrons. The carbon dioxide or dilute acid is added to the alkali silicate-ammonium ion solution until a pH in the range of about 10.4 to 11 is reached.

By dilute acid is meant a solution containing up to about 20 percent by weight of a mineral acid such as sulfuric acid, hydrochloric acid, phosphoric acid or nitric acid, or an organic acid such as formic acid, acetic acid, or propionic acid. Also included in the term mineral acid are the acid precursor gases such as sulfur trioxide, chlorine and nitric oxide. The preferred acidifying agent is carbon dioxide since it automatically functions as its own buffer.

After formation of the silica hydrosol, it is added to an ammonium salt solution which is preferably under vigorous agitation. The ammonium salt solution is a solution of a salt such as ammonium sulfate, ammonium nitrate, ammonium chloride, ammonium carbonate, ammonium bicarbonate, ammonium phosphate, ammonium bromide, ammonium formate, ammonium citrate, ammonium acetate or other organic ammonium salt. Ammonia may be added in the form of ammonia gas or dilute ammonium hydroxide to adjust the pH and act as a buffer. The concentration of the ammonium salt solution ranges from dilute to saturated. Ammonium salts are characteristically very soluble in water. For example, ammonium sulfate has a solubility of about 760 g. per liter of water at room temperature. A useful concentration range is from about 10 percent of solution saturation to saturation with the range of about 50 percent to complete saturation being preferred. Sufficient ammonia or ammonium hydroxide is added to adjust the pH of this ammonium salt solution to about 9.5 to 10.5. Preferably, this pH is adjusted to about 10. After addition of the silica hydrosol, the pH of the resulting silica slurry is about 9.2 to about 10.

The operation of the formation of the silica hydrosol and the addition of this silica hydrosol to the ammonium salt solution must be carried out in fairly rapid order. The silica hydrosol which is used in the process of this invention has a set time of from about 1 to 5 minutes and up to about 10 minutes if the hydrosol is cooled to about 0° C. By set time it is meant that if this silica hydrosol is allowed to stand for this period of time, the silica hydrosol will set to an all-liquid encompassing silica material. Such all-liquid phase encompassing silicas are generally known as silica hydrogels. The intent of this invention is not to produce a typical silica gel material. It is, therefore, important that after the partial acidulation of the alkali silicate solution to prepare the silica hydrosol, this silica hydrosol must be added in rapid order to the ammonium salt solution.

In one mode of the invention, either or both the silica hydrosol and the ammonium salt solution are maintained at a temperature of about 0° C. to 20° C. The cooling of the silica hydrosol retards setting to a soft gelatinous mass. The cooling of the ammonium salt solution causes the setting to occur at a lower temperature resulting in an increased set time. The overall effect is to produce smaller silica aggregates, since there is time for more silica nuclei to form, thereby resulting in a greater number of smaller particles. However, such a cooling of either the silica hydrosol and/or the ammonium salt solution is not required. It is, though, a definite preference that neither the silica hydrosol nor ammonium salt solution be heated above the prevailing ambient temperatures.

The next step of the process is to reduce the pH of the resulting silica slurry which also contains the ammonium salt to about 7.5 by the addition of a mineral acid solution such as a sulfuric acid solution. Sulfuric acid is the preferred acid, however, other mineral acids such as hydrochloric acid, phosphoric acid or nitric acid, or the precursor acid gases such as sulfur trioxide, chlorine or nitric oxide may also be used. The acid solution is preferably dilute, with a concentration of up to about 20 percent acid by weight. The silica slurry is then washed to remove sodium and ammonium acid salts. An acidic type wash scheme is preferred for this wash. The pH of the final wash solution is usually about 3.0.

At this point in the process, there are several options which may be followed. The silica slurry may now be oven dried, followed by being fed to a fluid energy mill or similar device for deaggregation to a particle size of from the primary micellular size up to about 1 micron. Alternatively, the silica slurry itself may be directly fed to a heated fluid energy mill or similar device for a concurrent rapid drying and deaggregation to give a silica material of a particle size in the range of the primary micellular particles (10–40 m$\mu$) up to about .5 micron. And yet another alternative is to first at least partially dewater the silica slurry with an organic solvent such as acetone or ethyl acetate and then feeding this at least partially dewatered silica slurry to a heated fluid energy mill to concurrently remove the organic and any water while reducing the particle size of the silica to the range of the primary micellular particles up to about .1 micron.

These differing processing techniques will produce silica materials with differing physical properties. For instance, an oven drying will produce a harder particle and a tighter aggregate. This will tend to increase the average particle size after a subsequent deaggregating operation. When the silica is concurrently deaggregated and dried in a heaed fluid energy mill, here is produced a loosely aggregated (soft), small particle size, aerogel type of silica. An aerogel silica is one which undergoes little or no structural shrinkage during drying. If the silica is first at least partially dewatered using an organic solvent and then deaggregated, there results a very soft and fine silica. This silica is also an aerogel type of silica.

If the dewatering alternative is to be practiced, the washing step may be altered to the degree that at least part of the removal of the sodium and ammonium acid salts may be conducted concurrently with the dewatering step. That is, the silica slurry is acid-water washed to remove part of the sodium sulfate content, followed by a dewatering with the organic solvent which concurrently with the removing of water also removes sodium and ammonium acid salts. This partial combining of the washing steps and the dewatering steps decreases the amount of wash water which must be used and also decreases the overall wash time and dewatering time which is required.

No matter which alternative is followed, there results a silica product which has a primary particle size usually in the range of about 10 to about 40 millimicrons and a pore volume of about 1 to 6 cc./g. This is the total volume of all pores, that is, the pore volume of the micropores and macropores (greater than 600 A. diameter). The surface area is in the range of about 300 to 700 m.$^2$/g.

These silica materials have proven to be very effective thickening agents, as well as rubber reinforcing agents. Thickening properties are determined by adding about 1 to 5 percent silica by weight to a mineral oil or polyester resin solution while stirring the resulting mixture at 3000 r.p.m. for 15 minutes. The mixed oil or resin solution is then brought to 25° C. by being placed in a constant temperature bath for about an hour. The sample is deaerated before and after temperature adjustment. The viscosity is then determined on a Brookfield Viscometer RV Model at 2 and 20 r.p.m. The thixotropic index is defined as the value at 2 r.p.m. divided by that obtained at 20 r.p.m. Commercially available mineral oils and polyester resins may be used for this test. The silica products of this invention at a concentration of 2 percent in mineral oil and polyester resin give viscosities of about 19,000 to 25,000 for mineral oil and about 1300 to about 4000 for polyester resins.

The term particle size used in this application means an average mean particle size on a weight percent basis. However, it has been found that the median particle size will also be within the designated ranges. The term silica aggregate as in this application means the agglomerated silica micellular particles whether chemically, physiochemically or physically attached. A solely mechanical aggregating as by compacting by pressing is not included within this designation. Fluid energy mills are devices which reduce the aggregate particle size of the silica by multiple particle contacts while the particles are suspended in a gaseous fluid. This gaseous fluid is usually heated air or steam, although other gases can be used. A detailed account of fluid energy mill operation can be found in Perry's Chemical Engineering Handbook, fourth edition, McGraw-Hill, 1963, 8:42–43. Very useful fluid energy mill devices are the Micronizer and Jet Pulverizer.

The following examples are set out to further amplify the present inventive process.

EXAMPLE 1

This example illustrates producing a silica starting with an 8 percent silica concentration sodium silicate solution and using an 18 to 1 silica ammonia ratio in this alkali silicate solution.

1200 milliliters of a sodium silicate solution containing 28 percent silica and 8.7 percent sodium oxide was diluted with 3300 milliliters water and 100 milliliters ammonium hydroxide solution (30 percent $NH_3$) while under agitation. Carbon dioxide gas was introduced and a colloidal sol formed. Then 800 grams of ice was added, and the sol was quickly poured into 5000 milliliters of a stirred solution containing 3000 grams ammonium sulfate, 500 milliliters of 30 percent ammonium hydroxide solution, and ice water. The newly formed silica slurry was further agitated in a Waring blender.

The pH of this newly silica slurry was 9.8. The pH of the slurry was then reduced to 7.7 by addition of 300 milliliters sulfuric acid dissolved in about 1500 milliliters water. The silica slurry was then filtered and washed on the filter using the following procedure.

The first wash consists of 9 liters of hot water containing 300 grams of ammonium sulfate. The second wash consists of 9 liters of hot water containing 90 milliliters sulfuric acid. The third wash consists of 9 liters hot water containing 10 milliliters sulfuric acid. The resulting silica filter cake was converted to a slurry in a high speed mixer and fed to a heated fluid energy mill using 600° F. air as the grinding fluid. The resulting material had a particle size in the range of about 20 to 100 millimicrons and was collected in the secondary bag collector of the fluid energy mill.

EXAMPLES 2–5

A series of runs were conducted using the procedure of Example 1 but varying the ratio silica hydrosol to ammonium salt solution concentration, as well as the ratio of ammonium sulfate to ammonia in this ammonium salt solution. At the time of addition of the silica hydrosol to the ammonium salt solution, both solutions were maintained at 5° C. The wash procedure was modified to consist of: first wash, 9 l. hot water containing 100 g.

$(NH_4)_2SO_4$, second wash, 9 l. hot water containing 30 ml. $H_2SO_4$ and third wash, 9 l. hot water containing ½ ml. $H_2SO_4$. The resulting silica was deaggregated in a Micronizer fluid energy mill using steam at a pressure of 225 p.s.i.g. The feed rate to the fluid energy mill was 100 ml./min. Table 1 sets out the parameters which were varied and the thickening value results in mineral oil and polyester resin.

TABLE 1

|  | Ex. 2 | Ex. 3 | Ex. 4 | Ex. 5 |
|---|---|---|---|---|
| Silica hydrosol (ml.) | 5,200 | 5,200 | 5,200 | 5,200 |
| $(NH_4)_2SO_4$(g.) | 500 | 1,250 | 2,500 | (¹) |
| $NH_3$ (ml. of 30%) | 750 | 190 | 375 | 450 |
| Total volume (ml.) | 12,000 | 3,000 | 6,000 | 6,000 |
| pH of mix | 9.7 | 9.8 | 9.9 | 9.7 |
| T.V. | 9.40 | 8.73 | 8.38 | 8.11 |
| $Na_2O$ | .06 | .03 | .04 | .05 |
| $SO_4$ | .40 | .35 | .15 | .13 |
| S.A. | 694 | 667 | 467 | 520 |
| Thickening in mineral oil (viscosity, cps.), 3% $SiO_2$ at— |  |  |  |  |
| 2 r.p.m | 32,300 | 30,100 | 32,150 | 24,750 |
| 20 r.p.m | 4,588 | 4,525 | 4,750 | 3,825 |
| Thickening in polyester (viscosity, cps.), 2% $SiO_2$ at— |  |  |  |  |
| 2 r.p.m | 1,300 | 1,375 | 1,300 | 1,300 |
| 20 r.p.m | 363 | 380 | 350 | 350 |

¹ 800 g. $Na_2SO_4$ 1,000 g. $(NH_4)_2SO_4$.

Examples 6–8

This example illustrates the effect of ammonium sulfate salt solution concentration, as well as the dewatering of the silica prior to feeding to a Micronizer fluid energy mill. In these preparations, the procedure of Example 1 was followed except the silica hydrosol and ammonium salt solution were maintained at 25° C. (room temperature) at the time of addition. The silica hydrosol contained 8 percent silica ($SiO_2$) and had a $SiO_2/NH_3$ ratio of 18/1.

The acetone dewatering consists of slurrying 454 g. of silica (dry basis) with 3 liters of acetone, filtering and rinsing with 3 liters of acetone. This acetone exchanging procedure is repeated 3 times.

Table 2 sets out the properties of the 454 g. of silica produced in each run.

TABLE 2

|  | Ex. 6 | Ex. 7 | Ex. 8 |
|---|---|---|---|
| $NH_4(SO_4)_2$ (g.) | 3,000 | 1,000 | 500 |
| T.V., percent | 5.31 | 10.56 | 11.94 |
| $Na_2O$, percent | .019 | .021 | .025 |
| $SO_4$, percent | 585 | 611 | 717 |
| 2% $SiO_2$/mineral oil (viscosity, cps.), Secondary at— |  |  |  |
| 2 r.p.m | 23,300 | 18,200 | 17,700 |
| 20 r.p.m | 3,625 | 3,020 | 2,850 |
| 2% $SiO_2$/polyester (viscosity, cps.), Secondary at— |  |  |  |
| 2 r.p.m | 3,450 | 3,050 | 3,150 |
| 20 r.p.m | 675 | 605 | 625 |

EXAMPLES 9–14

These examples illustrate the effect of the silica concentration in the silica hydrosol and a comparison of the micronizer fluid energy milling of an aqueous silica (Examples 9–11) and of an acetone exchanged silica (Examples 12–14). The acetone exchanged silicas of Examples 12–14 were dewatered by the technique used in Examples 6–8.

The excessively high thickening values in polyester resin at 2 percent $SiO_2$ levels for Examples 9, 10 and 11 was due to excess $H_2SO_4$ in the product acting as an additive in the polyester system.

TABLE 3

|  | Ex. 9 | Ex. 10 | Ex. 11 | Ex. 12 | Ex. 13 | Ex. 14 |
|---|---|---|---|---|---|---|
| Feed materials | 6% $SiO_2$ | 8% $SiO_2$ | 10% $SiO_2$ | 6% $SiO_2$ | 8% $SiO_2$ | 10% $SiO_2$ |
| Feed (percent $SiO_2$) |  |  |  |  |  |  |
| Pressure (p.s.i.g.) | 225 | 225 | 225 | 225 | 225 | 225 |
| Feed rate (ml./min.) | 100 | 100 | 100 | 50 | 50 | 50 |
| Outlet temp. (° F.) | 600 | 600 | 600 | 600 | 600 | 600 |
| 2% $SiO_2$ in mineral oil at— |  |  |  |  |  |  |
| 2 r.p.m | 12,350 | 13,200 | 10,200 | 17,300 | 21,000 | 14,750 |
| 20 r.p.m | 2,250 | 2,345 | 1,895 | 2,920 | 3,445 | 2,440 |
| 2% $SiO_2$ in polyester resin at— |  |  |  |  |  |  |
| 2 r.p.m | 7,000 | 6,450 | 4,000 | 2,900 | 3,100 |  |
| 20 r.p.m | 995 | 885 | 600 | 585 | 610 |  |
| T.V., percent | 15.2 | 13.0 | 13.1 | 14.4 | 11.8 | 2.3 |
| $Na_2O$, percent | .03 | .02 | .02 | .01 | .01 | .01 |
| $SO_4$, percent | 7.8 | 4.5 | 3.3 | .45 | .14 | .46 |

What is claimed is:

1. A process for producing a silica composition comprising:

forming an ammonium salt solution;

adding an acid to an ammoniated alkali silicate solution to decrease the pH to about 10.4 to 11 and thereby form a silica hydrosol;

rapidly admixing said silica hydrosol with said ammonium salt solution to effect the formation of a loosely aggregated silica;

adjusting the pH of said silica to about 7 to 8, whereby residual alkali silicate is neutralized; and washing said silica substantially free of cationic and anionic contaminants.

2. A process as in claim 1 wherein said ammonium salt solution is an ammoniated ammonium salt solution having an ammonium salt concentration of about 10 percent of saturation to saturation and a pH of about 9.5 to 10.5.

3. A process as in claim 2 wherein said ammonium salt solution contains an ammonium salt selected from the group consisting of ammonium sulfate, ammonium chloride, ammonium nitrate, ammonium carbonate, ammonium bicarbonate, ammonium phosphate, ammonium bromide, ammonium formate, ammonium acetate and ammonium citrate.

4. A process as in claim 3 wherein said ammonium salt solution is an ammonium sulfate solution.

5. A process as in claim 2 wherein said ammoniated alkali silicate solution contains from about 4 perecnt to 12 perecnt $SiO_2$ and has a $SiO_2:NH_3$ ratio of about 6:1 to 20:1.

6. A process as in claim 5 wherein said $SiO_2$ content is about 8 percent, and said $SiO_2:NH_3$ ratio is about 18:1.

7. A process as in claim 2 wherein said acid is carbon dioxide.

8. A process as in claim 2 wherein said acid is a dilute acid selected from the group consisting of sulfuric acid, hydrochloric acid, nitric acid, phosphoric acid, formic acid and acetic acid.

9. A process as in claim 8 wherein said acid is dilute sulfuric acid.

10. A process as in claim 4 wherein after washing, said silica is at least partially dewatered using an organic solvent.

11. A process as in claim 10 wherein said organic solvent is selected from the group consisting of acetone and ethyl acetate.

12. A process as in claim 7 wherein the dewatered silica is concurrently deaggregated and dried by fluid energy milling.

13. A process as in claim 4 wherein a portion of the anionic and cationic contaminants are removed in a dewatering of said silica using an organic solvent.

14. A process as in claim 11 wherein said organic solvent is selected from the group consisting of acetone and ethyl acetate.

15. A process as in claim 10 wherein the dewatered silica is concurrently deaggregated and dried by fluid energy milling.

16. A process as in claim 4 wherein the washed silica is concurrently deaggregated and dried by fluid energy milling.

17. A process as in claim 4 wherein the washed silica is dried and subsequently deaggregated by fluid energy milling.

References Cited

UNITED STATES PATENTS

| | | | |
|---|---|---|---|
| 2,280,649 | 4/1942 | Kanhofer | 252—451 |
| 2,850,451 | 9/1958 | Sirianni et al. | 252—317 X |
| 3,208,823 | 9/1965 | Baker et al. | 260—746 |
| 3,453,077 | 7/1969 | Hyde | 252—451 X |
| 3,574,135 | 4/1971 | Sampson et al. | 252—317 |

RICHARD D. LOVERING, Primary Examiner

U.S. Cl. X.R.

252—28, 313 S; 260—40 R; 423—338, 339